July 11, 1961

L. S. CROWL 2,991,724

PLUNGER AND VALVE ASSEMBLY

Filed Feb. 11, 1958

INVENTOR.
LELAND S. CROWL
BY *Jerry J. Dunlap*
ATTORNEY

United States Patent Office 2,991,724
Patented July 11, 1961

2,991,724
PLUNGER AND VALVE ASSEMBLY
Leland S. Crowl, 1914 NW. 36th St.,
Oklahoma City, Okla.
Filed Feb. 11, 1958, Ser. No. 714,631
4 Claims. (Cl. 103—225)

This invention relates generally to improvements in subsurface well pumps of the reciprocating type, and more particularly, to a novel plunger and valve assembly for such pumps.

As it is well known in the oil industry, the majority of oil wells being produced by artificial lifting means are pumped by use of sucker rod type reciprocating pumps. Such pumps comprise, generally speaking, a working barrel having a standing valve assembly in the lower end thereof and a tubular plunger reciprocally disposed in the working barrel. At least one, and usually two, traveling valves are secured on the lower end of the tubular plunger. Each traveling valve comprises a valve body, a ball, seat, ball guide, and a stop in the body to limit the upward movement of the ball.

At the present time, each traveling valve is constructed in the form of a tubular body adapted to be threadedly secured to the lower end of the pump plunger. The ball stop is ordinarily made an integral part of the valve body in the form of a partition extending across the valve body and having holes drilled through the partition. The ball guide is ordinarily formed as a part of the valve body by milling circumferentially spaced grooves in the inner periphery of the valve body below the ball stop. It will be apparent that the machining time involved in forming a valve body of this type is substantial and requires a large number of machine set-ups. Also, any heat treating of the ball stop and the ball guide must also be performed on the valve body; whereas each of these elements should be heat treated differently to obtain the maximum service life for the traveling valve assembly. The valve seat is ordinarily made a separate elements and inserted in the valve body below the ball guide. The valve seat is retained in a fixed position in the body, by the use of either a tubular adapter or another valve body secured in the lower end of the valve body. A second valve body is used when it is desired to form a double traveling valve assembly. It may also be noted that the traveling valve bodies are secured on the lower end of the plunger, therefore the effective length of a plunger may be increased by an amount equal the length of the valve body or valve bodies.

Present day standing valve assemblies for use in the lower end of the working barrels are constructed in substantially the same manner as the traveling valve assemblies, except that the standing valve body is usually secured on the upper end of a tubular mandrel having a plurality of seating cups thereon to anchor the standing valve assembly in the lower end of the working barrel.

The present invention contemplates a novel plunger construction wherein the plunger itself forms the valve body for the traveling valve or valves. The ball stop, guide and seat are formed as separate elements and inserted in the lower end of the plunger in such a manner that no leakage will occur around these separate elements. The separate parts of the traveling valve may be heat treated in any desired manner, and the effective length of a plunger may be increased by an amount equal to the length of the traveling valve assembly. Furthermore, the present plunger construction greatly facilitates the use of double traveling valves.

The present invention also contemplates a novel valve assembly having separate ball stops, guides and seats which may be used as a standing valve in the lower end of a pump working barrel.

An important object of this invention is to provide an economical pump plunger and valve assembly construction.

Another object of this invention is to increase the effective length of pump plungers.

A further object of this invention is to increase the service life of traveling and standing valve assemblies.

A still further object of this invention is to facilitate the assembly, particularly in the field, of traveling and standing valves.

Other objects and advantages of the invention will be evident from the following detailed description, when read in conjunction with the accompanying drawings which illustrate my invention.

Figure 1:
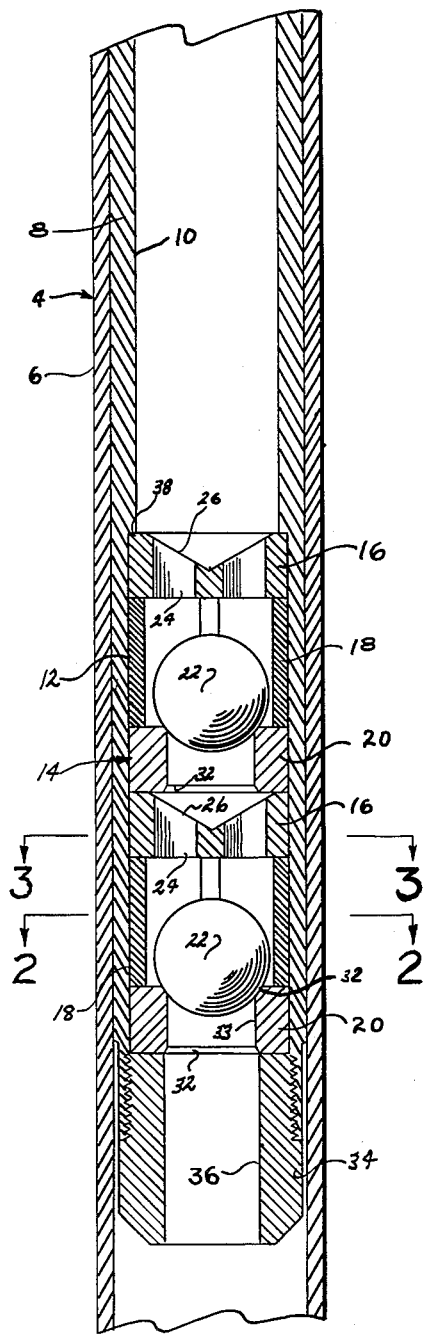
FIGURE 1 is a vertical sectional view through a portion of a sub-surface well pump of the reciprocating type having a plunger and valve assembly therein constructed in accordance with this invention.

Referring to the drawings in detail, reference character 4 generally designates a sucker rod type pump (only a portion of which is shown) which includes a tubular working barrel 6 having a standing valve assembly (not shown) in the lower end thereof. An elongated plunger 8 is slidingly disposed in the working barrel 6 and has a bore 10 extending longitudinally therethrough. In accordance with the present invention, a counter-bore 12 is formed in the lower end of the plunger 8 concentrically around the bore 10 to receive my novel valve assembly which is generally designated by reference character 14.

Figure 3:
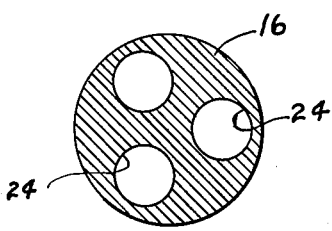
FIGURE 3 is a partial sectional view as taken along lines 3—3 of FIG. 1.

The valve assembly 14 comprises one or more sets of ball stops 16, ball guides 18, ball seats 20, and ball type valves 22. As shown most clearly in FIG. 3, each ball stop 16 is in the form of a circular disk having a plurality of circumferentially spaced bores 24 extending vertically therethrough. It will be understood, of course, that any desired number of bores 24 may be provided, although I have found that three are sufficient to provide an unrestricted flow of fluid upwardly through the valve assembly 14. Referring back to FIG. 1 it will be observed that a conical recess 26 is formed in the upper face of each ball stop 16. Each conical recess 26 is formed in the center of the respective disk 16 and communicates with all of the bores 24 extending through the respective disk.

Figure 2:
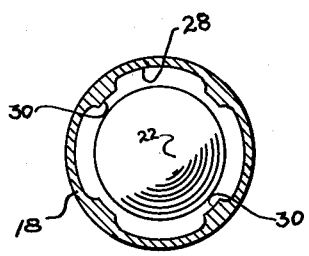
FIGURE 2 is a partial sectional view as taken along lines 2—2 of FIG. 1.

Each ball guide 18 is in the form of a sleeve having a plurality of circumferentially spaced slots 28 (FIG. 2) milled in the inner periphery thereof along the axis of the sleeve. The slots 28 provide circumferentially spaced shoulders 30. The shoulders 30 are formed on a radius slightly larger than the radius of the ball 22 to guide the respective ball 22 and minimize the normal rotation of the ball as it approaches the respective seat 20. The slots 28 form passageways for the upward flow of fluid through the respective sleeve 18.

Each seat 20 is in the form of an annular shaped member having seating areas 32 formed at both the upper and lower ends of the member concentrically around the inner bore 33 of the member. Each seating area 32 is of a size to receive the respective ball 22 and prevent a downward flow of fluid through the valve assembly 14. It will thus be observed that each of the seats 20 may be inserted in the plunger 8 in either direction and will operate effectively.

Each of the members 16, 18 and 20 has an outer diameter of a size to provide a sliding fit of the member in the counter-bore 12 of the plunger 8. It is also to be understood that a traveling valve assembly may comprise a single stop 16, sleeve 18, seat 20 and ball 22 and the objects of the present invention will be obtained. However, the majority of present day sucker rod pumps are used with two traveling valves, therefore I have shown a double seat of stops 16, sleeves 18, seats 20 and balls 22 in the plunger 8. As shown in FIG. 1, the two sets of elements are inserted in the counter-bore 12 in end-to-end relation, such that the plunger 8 forms the valve body around the working parts of the traveling valve assembly 14. A tubular adapter 34 is threadedly secured in the lower end of the plunger 8 into contact with the lower end of the lower seat 20. The inner bore 36 of the adapter 34 is of substantially the same size as the bore 33 through the adjacent seat 20, and the adapter 34 is of a length to extend from the lower seat 20 to a point below the plunger 8. Thus, any fluid flowing downwardly through the lower seat 20 will be directed through the adapter 34 and will have no opportunity to flow outwardly into contact with the inner periphery of the plunger 8, where it would tend to wash out the plunger. The adapter 34 is threaded into the lower end of the plunger 8 until the upper disk 16 contacts the downwardly facing shoulder 38 formed between the bore 10 and counter-bore 12.

Each member of the traveling valve assembly 14 is obviously machined separately, and may be heat reated in the manner which will obtain the maximum service life therefor. Also, the mating surfaces of each of the members 16, 18 and 20, as well as the shoulder 38 at the upper end of the counter-bore 12, should be machined smooth to obtain a metal-to-metal seal of the contacting surfaces when the adapter 34 is threaded tightly into the lower end of the plunger 8. With this metal-to-metal seal, fluid present in the bore 10 of the plunger 8 will be prevented from flowing either outwardly around the upper disk 16, or outwardly between any of the contacting members of the assembly 14 where the fluid would tend to wash out the inner periphery of the plunger 8 and render the assembly 14 useless as a traveling valve.

The pump 4 operates in the usual manner, in that well fluid is drawn into the lower portion of the working barrel 6 below the plunger 8 on the up-stroke of the pump, and fluid is forced through the plunger 8 on the down-stroke of the pump. The fluid forced through the plunger 8 lifts the balls 22 off of the seats 20, in order that the upwardly moving well fluid can flow around the balls 22 through the grooves 28 in the ball guides 18. It may also be noted that the conical recess 26 in the upper face of the lower ball stop 16 permits an unrestricted flow of fluid from the respective bores 24 through the adjacent upper seat 20. If such conical recess 26 were not provided, the lower face of the seat 20 would block off a portion of the bores 24 in the adjacent lower disk 16. I have shown the upper disk 16 as also having a conical recess 26, since such construction permits interchanging of the disks 16 and greatly facilitates the assembly of the valve assembly 14 in the field. In this connection it may also be noted that the valve seats 20 and sleeves 18 may be inserted in the counter-bore 12 in either direction and will operate in the same manner.

With respect to economy, it will be observed that the disk 16 and sleeves 18 are machined separately to eliminate the necessity of reaching a substantial distance into an elongated tubular body for a drilling or milling operation, as is presently required in such valve constructions. The bores 24 and the conical recess 26 may be formed in each disk 16 in a very simple and convenient manner, without the use of special tools or machinery. Also, the grooves 28 may be milled in each sleeve 18 with conventional apparatus.

From the foregoing it will be apparent that the present invention contemplates a novel pump plunger construction wherein the length of the plunger may be made a maximum, since the traveling valve is contained within the plunger and the plunger forms the valve body for the traveling valve assembly. It will be further apparent that the present valve assembly is simple in construction, may be economically manufactured, and will have a substantial service life. It will also be apparent that the present valve assembly may be assembled in a plunger or standing valve construction in a simple manner by normal operating personnel, with little likelihood that the parts of the valve assembly will be incorrectly arranged and the valve rendered inoperative.

Changes may be made in the combination and arrangement of parts or elements as heretofore set forth in the specification and shown in the drawings, it being understood that changes may be made in the precise embodiment shown without departing from the spirit and scope of the invention as defined in the following claims.

I claim:

1. A valve assembly for controlling the flow of abrasive fluids, comprising a tubular housing having a lower end forming an inlet and an upper end forming an outlet for the abrasive fluids, said housing having a counterbore therein extending from the lower end thereof partially therethrough to form a downwardly facing circumferential shoulder in said housing; a heat-treated perforated disk slidingly fitting in said counterbore against said shoulder; a heat-treated sleeve slidingly fitting in said counterbore below said disk; a heat-treated annular seat slidingly fitting in said counterbore below said sleeve; tubular means threaded into the lower end of said housing holding said seat, sleeve and disk in contacting end-to-end relation, with said disk in contact with said shoulder; said shoulder, disk, sleeve and seat having the mating surfaces thereof machined to provide metal-to-metal seals of said surfaces, and a ball loosely disposed in said sleeve for flow of fluid upwardly around said ball and through said sleeve and being of a size to mate with said seat to prevent a flow of fluid downwardly through the valve assembly, said sleeve being solid-walled to prevent fluid deflected by said ball from contacting the inner periphery of said housing, and said sleeve having circumferentially spaced shoulders extending axially along the inner periphery thereof to minimize the spinning of said ball.

2. A valve assembly for controlling the flow of abrasive fluids, comprising a tubular housing having a lower end forming an inlet and an upper end forming an outlet for the abrasive fluids, said housing having a counterbore therein extending from the lower end thereof partially therethrough to form a downwardly facing circumferential shoulder in said housing; a first heat-treated perforated disk having an upper face and a lower face and slidingly fitting in said counterbore against said shoulder; a first heat-treated sleeve having an upper end and a lower end and slidingly fitting in said counterbore with its upper end contacting the lower face of said disk; a first heat-treated annular seat having an upper face and a lower face and slidingly fitting in said counterbore in contact with the lower end of said first sleeve; a second heat-treated perforated disk having an upper face and a lower face and slidingly fitting in said counterbore against the lower face of said first seat; a second heat-treated sleeve having an upper end and a lower end and slidingly fitting in said counterbore with the upper end thereof in contact with the lower face of said second disk; a second heat-treated annular seat having an upper face and a lower face and slidingly fitting in said counterbore in contact with the lower end of said second sleeve; tubular means threaded into the lower end of said housing in contact with the lower face of said second seat for holding said seats, sleeves and disks in contacting end-to-end relation, with said first disk in contact with said shoulder; said shoulder, disks, sleeves and seats having the mating surfaces thereof machined to provide metal-to-metal seals of said surfaces, and a ball loosely disposed in each of said sleeves for flow of fluid upwardly around the respective ball and through the respective sleeve and being of a size to mate with the respective seat to prevent a flow of fluid downwardly through the valve assembly, each of said sleeves being solid-walled to prevent fluid deflected by the respective ball from contacting the inner periphery of said housing, and each of said sleeves having circumferentially spaced shoulders extending axially along the inner periphery thereof to minimize the spinning of the respective ball.

3. An assembly as defined in claim 2 characterized further in that the upper face of each of said disks has a conical recess in the central portion thereof communicating with the perforations through the respective disk.

4. A plunger for a reciprocating subsurface well pump, comprising an elongated body having a longitudinal bore therethrough and a counterbore in the lower end thereof forming a downwardly facing circumferential shoulder; a first heat-treated perforated disk having an upper face and a lower face and slidingly fitting in said counterbore against said shoulder; a first heat-treated sleeve having an upper end and a lower end and slidingly fitting in said counterbore with its upper end contacting the lower face of said first disk; a first heat-treated annular seat having an upper face and a lower face and slidingly fitting in said counterbore in contact with the lower end of said first sleeve; a second heat-treated perforated disk having an upper face and a lower face and slidingly fitting in said counterbore against the lower face of said first seat; a second heat-treated sleeve having an upper end and a lower end and slidingly fitting in said counterbore with the upper end thereof in contact with the lower face of said second disk; a second heat-treated annular seat having an upper face and a lower face and slidingly fitting in said counterbore in contact with the lower end of said second sleeve; a tubular adapter threaded into the lower end of said body against the lower face of said second seat for holding said seats, sleeves and disks in contacting end-to-end relation, with said first disk in contact with said shoulder, said tubular adapter having a length to extend from said second seat to below the lower end of said body; said shoulder, disks, sleeves and seats having the mating surfaces thereof machined to provide metal-to-metal seals of said surfaces, and a ball loosely disposed in each of said sleeves for flow of fluid upwardly around the respective ball and through the respective sleeve and being of a size to mate with the respective seat to prevent a flow of fluid downwardly through said body, each of said sleeves being solid-walled to prevent fluid deflected by the respective ball from contacting the inner periphery of said body, and each of said sleeves having circumferentially spaced shoulders extending axially along the inner periphery thereof to minimize the spinning of the respective ball.

References Cited in the file of this patent

UNITED STATES PATENTS

| | | |
|---|---|---|
| 1,309,738 | Latta | July 15, 1919 |
| 1,362,456 | Wigle | Dec. 14, 1920 |
| 1,909,493 | Knox | May 16, 1933 |
| 2,026,058 | Perry | Dec. 31, 1935 |
| 2,061,060 | Carlson | Nov. 17, 1936 |
| 2,061,480 | Pigott | Nov. 17, 1936 |
| 2,085,360 | Hammett | June 29, 1937 |
| 2,138,002 | Hall | Nov. 29, 1938 |
| 2,557,247 | Ziherl | June 19, 1951 |
| 2,591,174 | Martin | Apr. 1, 1952 |
| 2,684,638 | Sutton | July 27, 1954 |
| 2,804,829 | Mullins | Sept. 3, 1957 |
| 2,910,998 | Davis | Nov. 3, 1959 |